March 12, 1963 E. ROGAL 3,081,445

AUTOMATIC DATA SORTING DEVICES

Filed Jan. 5, 1959 4 Sheets-Sheet 1

INVENTOR.
Edward Rogal
BY
Morse & Altman
ATTORNEYS

INVENTOR.
Edward Rogal
BY Morse & Altman
ATTORNEY

March 12, 1963 E. ROGAL 3,081,445

AUTOMATIC DATA SORTING DEVICES

Filed Jan. 5, 1959 4 Sheets-Sheet 3

INVENTOR.
Edward Rogal
BY
Morse & Altman
ATTORNEYS

March 12, 1963 E. ROGAL 3,081,445

AUTOMATIC DATA SORTING DEVICES

Filed Jan. 5, 1959

4 Sheets-Sheet 4

INVENTOR.

Edward Rogal

BY

Morse & Altman

ATTORNEYS

United States Patent Office 3,081,445

Patented Mar. 12, 1963

3,081,445

AUTOMATIC DATA SORTING DEVICES

Edward Rogal, North Scituate, Mass., assignor to Universal Controls, Inc., New York, N.Y., a corporation of Maryland Filed Jan. 5, 1959, Ser. No. 784,914
10 Claims. (Cl. 340—172.5)

The present invention relates to the sorting of data, and more particularly, to a data processing system to which may be imparted a record representing increments of information in random sequence and from which signals representing the increments of information in predetermined order may be recovered.

The object of the present invention is to provide a compact and versatile information sorting system that is designed to sort data into predetermined order in a novel manner. More specifically, this system comprises: a transfer medium for receiving a record representing random increments of information; a control circuit for receiving from the transfer medium signals representing the random increments of information and for routing these signals in response to portions of the information contained therein; and a plurality of sorter media for selectively receiving from the control system signals representing the increments of information and for returning such signals in re-ordered sequence to the transfer medium. The system is designed to operate on information increments of a type having (1) an address portion in the form of an ordered digital sequence, e.g. a decimal sequence having conventional units, tens, hundreds, etc. positions or orders, of intrinsic significance, i.e., to the sorting system itself, and (2) a data portion in digital or other form of extrinsic significance, e.g. to statistical facts of interest.

Other objects of the invention will in part be obvious and will in part appear hereinafter.

The invention accordingly comprises the apparatus possessing the construction, combination of elements and arrangement of parts which are exemplified in the following detailed disclosure, and the scope of which will be indicated in the appended claims.

For a fuller understanding of the nature and objects of the invention, reference should be had to the following detailed description, taken in connection with the accompanying drawings wherein.

Generally each of the embodiments of the present invention herein illustrated comprises: a transfer tape surfaced with a magnetic material which receives a record representing random increments of information; a control circuit for receiving from the transfer tape signals representing the random increments of information and for routing these signals in response to portions of the information contained therein; and a plurality of sorter tapes, each surfaced with a magnetic material, for selectively receiving signals representing the increments of information and for returning such signals in reordered sequence to the transfer tape. The increments of information to be sorted each includes an address portion in the form of a group of decimal digits and a data portion in the same or other form. The group of decimal digits of the address, in conventional fashion, has units, tens, hundreds, etc. positions or orders. The illustrated systems are designed to sort these addresses in accordance with a preselected program, i.e., to arrange these addresses in a desired sequence. For example, the addresses can be sorted into a sequence in which the numbers corresponding to the various groups of digits are arranged in a sequence of increasing or decreasing magnitude. Such a sequence is capable of providing statistical information relative to the data associated with the addresses.

The magnetic medium may be composed, for example, of powdered iron oxide dispersed in a suitable synthetic organic polymer. The read-in and read-out heads or transducers for the magnetic medium are of the type, for example, including a minute iron horseshoe having windings capable of producing magnetic induction in its legs. It is to be understood, however, that the system of the present invention may utilize a storage medium other than a magnetic medium, for example, an electrostatic medium. The signals read to and from the tapes are in the form of selected frequencies or tones that are coded to correspond with selected decimal digits. It is to be understood, however, that signals other than frequencies, for example binary pulses, are similarly useful.

*The System of FIGS. 1 Through 5*

Figure 1:
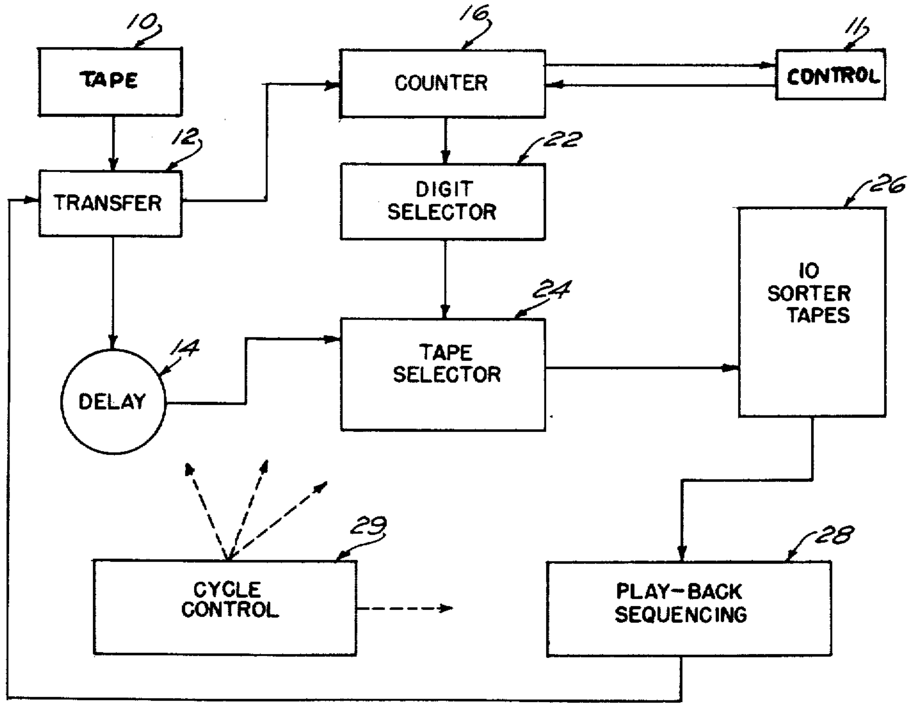
FIGURE 1 is a block diagram of an automatic data sorting system embodying the present invention.

With reference now to the system of FIGS. 1 through 5, the operation of this system generally will be understood in reference to FIG. 1. Initially random data to be sorted is carried sequentially on a magnetic tape 10. Tape 10 serves as an input to the system in response to a control unit 11. Since it may be desired to conserve this original data, this data first is retained on tape 10 and is read to a transfer tape 12. The operation of the system will become apparent by considering a typical sorting operation. By way of illustration, the following sorting operation places the increments of information in the numerical order of their addresses. As transfer tape 12 is placed, the random data is read to a cyclic magnetic storage drum 14 which serves as a delay. The random increments also are read to a counter 16, which initially is set to process the addresses by isolating for further consideration the digits of their lowest decimal column or order. A digit selector 22 next determines the values of these isolated digits in order to actuate a tape selector 24. Tape selector 24 establishes paths for reading information from delay drum 14 to appropriate sorter tapes 26. All information on transfer tape 12 is transmitted in this manner. Then the partially sorted data on sorter tapes 26 is recorded sequentially onto transfer tape 12 under control of a play-back sequencing control 28. Counter 16 then is adjusted to sort the next lowest order digit by a four cycle control unit 29, which establishes a complete cycle for each order. In the case of addresses including six ordered digits, at the conclusion of six complete cycles, the six digit addresses are arranged in numerical order on transfer tape 12 and the sorting operation is completed.

Figure 2:
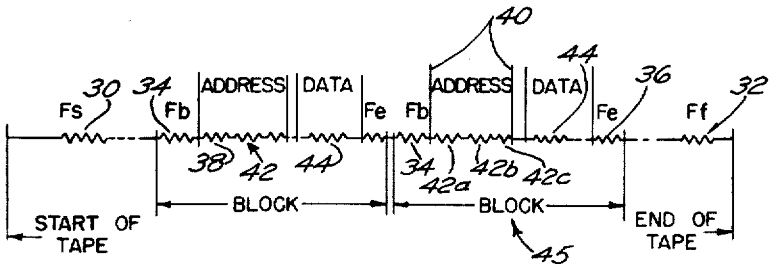
FIG. 2 represents the form of increments of information processed by the system of FIG. 1.

A preferred coding technique is illustrated in FIG. 2. Representations of random data to be sorted, which are recorded on tape 10, comprise an address portion 40 and a data portion 44 within a block 45. Four distinct control tones are used. These control tones include: a tape start tone ($Fs$) 30; a tape complete tone ($Ff$) 32; an address start tone ($Fb$) 34; and an address complete tone ($Fe$) 36. Each address 40 comprises three address pulses 42*a*, 42*b* and 42*c*, each composed of two superposed, non-interfering frequencies of which the first is selected from a first group of ten frequencies, $f0$–$f9$, and the second is selected from a distinct second group of ten frequencies, $f10$–$f19$. Each two-frequency pulse may be termed a "blob." Thus each pulse may be decoded into two decimal numbers. In other words, address 40 is in the form of a six digit number comprising three blobs 42, and is followed by such data 44 as may be desired. Data 44 may be coded in frequency or other convenient form.

Figure 3:
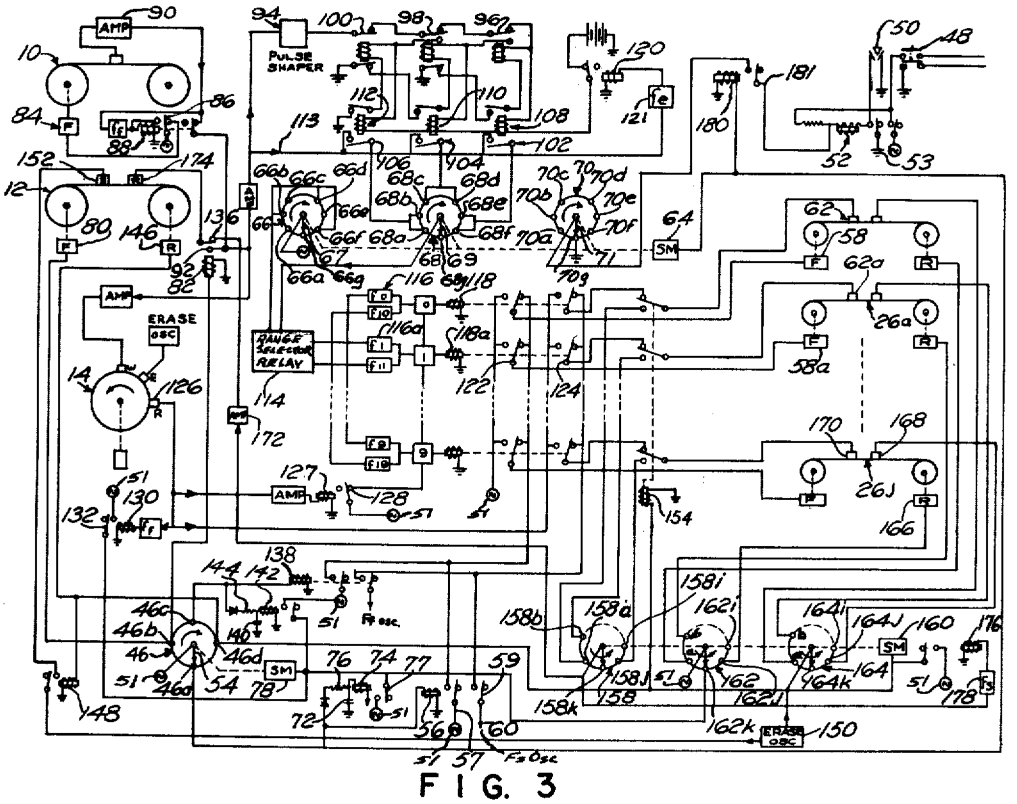
FIG. 3 is a schematic diagram of the electrical circuit of the system of FIG. 1.

The electrical circuit of the system of FIGS. 1 through 5 is shown schematically in FIG. 3. The operation is such that four basic cycles are under the control of a distributor 46. The first cycle initiates the advancement of ten sorter tapes 26*a–j* and records tape start tone 30 on each simultaneously. The second cycle effects the sorting from transfer tape 12 to sorter tapes 26. The third cycle is similar to the first cycle except that tone 32 is recorded. The fourth cycle sequentially plays back sorter tapes 26 to transfer tape 12 and erases ten sorter tapes 26.

In operation, line switch 48 is closed and operate button 50 is actuated. This closes a relay 52 which locks to a ground 53 in order to connect power source points 51 into the electrical system. The device starts on the first cycle. Power applied to a wiper 54 of distributor 46 is applied to a first position contact point 46*a* and energizes a relay 56. Relay 56 applies power to a forward drive bus 57, which energizes ten sorter tape forward drives 58. A second contact 59 on relay 56 connects a tape start tone oscillator 60 to ten sorter tape read-record heads 62. Contact point 46*a* also connects to a stepping magnet 64 on distributors 66, 68, 70 of digit selector 22 advancing magnet 64 to first position contact points 66*a*, 68*a*, 70*a* by means of wipers 67, 69, 71 respectively. During these operations, a capacitor 72 across a time delay relay 74 has been charging through a resistor 76. When voltage reaches the required value, relay 74 is energized, connecting a line switch 77 to a stepping magnet 78. As distributor 46 is stepped to a second position contact point 46*b*, relay 56 releases and forward drives 58 stop. Contact 46*b* energizes a forward tape drive 80 of transfer tape 12 and closes a read-write relay 82. A forward drive 84 of tape 10 has been energized through a break contact 86 on a relay 88. The information on tape 10 is read out through an amplifier 90 and through a read contact 92 of relay 82 to transfer tape 12 and delay drum 14. The information also passes to a pulse shaper unit 94, FIG. 3, in which frequencies in the band from zero to nineteen are employed to generate ground pulses that operate counter 16.

The operation of counter 16 is as follows. A first ground pulse closes a relay 96, a second ground pulse closes a relay 98 and releases relay 96, a third ground pulse closes relay 100 and releases relay 98, etc. Make contacts 102, 104, 106 on lower counter relays 108, 110, 112 connect a bus 113, on which data from tape 10 is appearing, to contact points 68*a, b, c, d, e, f* of distributor 68. From the action of counter 16, which is actuated by pulses 42, only a third pulse 42*a* can appear at contact point 68*e* and 68*f*, only a second pulse 42*b* can appear at contact point 68*c* and 68*d*, and only a first pulse 42*c* can appear at contact point 68*a* and 68*b*. Contact points 66, 68, 70*a, b, c, d, e, f* of distributors 66, 68, 70 correspond to the increasing order of address digits by which sorting is to proceed, i.e., pulse 42*a* contains the lowest and next lowest order digits of address 40, and pulse 42*c* contains the highest and next highest order digits in address 40. Counter 16 thus makes a selection in time by selecting one out of three pulses 42 and making it available to wiper 69 of distributor 68. Since each pulse 42 contains two frequencies, each selected from a distinct group of ten frequencies, a selection in frequency range is accomplished by a range selector relay 114 in conjunction with twenty filters 116 associated with different frequencies from zero to nineteen and with distributor 66. Tape selector relays 118 are operated by two frequencies, one from each distinct group of ten frequencies. The inputs to filters 116 in each frequency group are tied together and connected to relay 114. Relay 114 is operated at contact points 66*b*, 66*d*, 66*f* of distributor 66, in which position, only frequencies in the range $f10$–$f19$ can operate selector relays 118. When relay 114 is released, only frequencies in the range $f0$–$f9$ can operate selector relays 118. Pulses 42 thus are decoded, both in time and in frequency, into decimal digits as distributors 66, 68, 70 of digit selector 22 progress across contact points 66, 68, 70*a* to *f*. Relay 120 clears counter 16 at the end of block 45 when tone 36 appears at 121.

Assuming that address 40 arriving from tape 10 is 684,931. Since sorting is to proceed by the lowest order digit, here a "1," distributor 68 is positioned at contact point 68*a*, relay 114 is released, and a filter 116*a* energizes a selector relay 118*a*, which is locked by a conventional circuit (not shown). A set of switches 122 and 124 on relay 118*a* close, whereupon switch 122 applies power to forward drive 58*a* and switch 124 connects recording head 62*a* on sorter tape 26*a* to a reading head 126 on delay drum 14. The purpose of delay drum 14 is to withhold block 45 from tape 10 until the described decoding and selection ocur. Block 45 now is read from delay drum 14, through the path that has been selected for it by selector relay 118*a* to sorter tape 26*a*. When tone 36 appears, signifying the end of block 45, relay 127 is pulsed in order to remove power from locking bus 128, which is common to ten selector relays 118. Relay 118*a* thereby is released for the purpose of stopping forward drive 58*a*. Entire block 45 now has been transferred from tape 10 to sorter tape 26*a*. This process continues until entire tape 10 has been played through, at which time all data on tape 10 has been distributed to ten sorter tapes 26 by the lowest order digit.

When tone 32, signalling the end of tape 10, appears, a relay 130 is energized. Relay 130 operates a switch 132 to connect the line to stepping magnet 78 for the purpose of advancing wiper 54 of distributor 46 to a contact point 46*c*. Tone 32 also pulses relay 88 which locks. Since during the first cycle all data on tape 10 has been transferred to transfer tape 12, relay 88 disconnects tape 10 from the circuit for the remainder of the sorting operation. When wiper 54 of distributor 46 leaves contact point 46*b*, forward drive 80 of transfer tape 12 is stopped and relay 82 is positioned at a read-in contact 136. Contact point 46*c* on distributor 46 initiates a time delay cycle similar to that described with respect to contact point 46*a* except that tone 32 is recorded on sorter tapes 26 by a relay 138 acting in conjunction with a capacitor 140 across a time delay relay 142 and charging through a resistor 144. At the expiration of the time delay (4 or 5 seconds), relay 142 is energized to place line voltage on stepping magnet 78 and to advance it to contact 46*d*. In consequence, a reverse drive 146 on transfer tape 12 is energized.

Also, a relay 148 connects an erase oscillator 150 to a transfer tape head 152 and energizes a relay 154. Relay 154 connects read heads 62 to a distributor 158 at ten contact points 158*a–j*, and pulses a stepping magnet 160 of distributors 158, 162, 164 to contact points 158*j*, 162*j*, 164*j*. The purpose of distributors 158, 162, 164 is to play back ten sorter tapes 26 for recording on transfer tape 12 in sequential order from a last sorter tape 26*j* to a first sorter tape 26*a*. When distributors 158, 162, 164 are stepped to contact points 158*j*, 162*j*, 164*j*, a reverse drive 166 of sorter tape 26*j* is actuated. Now distributor 164 connects erase oscillator 150 to an erase head 168 on sorter tape 26*j* and distributor 158 connects a read head 170 of sorter tape 26*j* through an amplifier 172 to a read head 174 of transfer tape 12. When tone 30 appears on sorter tape 26*j*, it pulses a relay 176 through a tape start tone filter 178, stepping distributors 158, 162, 164 to contact points 158*i*, 162*i*, 164*i*. When sorter tape 26*j* has played, distributors 158, 162, 164 are stepped to their next respective contact points, etc., until starter tape 26*a* has played. Thereafter distributors 158, 162, 164 steps to home position contact points 158*k*, 162*k* 164*k*. As distributor 162 is stepped to contact point 162*k*, distributor 46 is pulsed to contact point 46*a*, thereby releasing relay 154, relay 148 and reverse drive 146. Thereafter distributors 66, 68, 70 of digit selector 22 are energized by current from position 46*a* acting on stepping magnet 64 and are caused to move to contact points 66*b*, 68*b*, 70*b* and to initiate the first cycle time delay. When transfer tape 12 now is advanced in a forward direction, all addresses 40 appear in numerical order by the lowest order digit progressing in sequence from zero to nine.

The entire operation repeats as before, except that distributors 66, 68, 70 of digit selector 22 are positioned at contact points 66*b*, 68*b*, 70*b* so that the device now sorts by the next lowest order digit, located in third blob 42*a*. Under these conditions, relay 114 is energized. Sorting continues in such manner that distributors 66, 68, 70 advance wipers 67, 69, 71 one position each time distributor 46 completes the four cycles and returns to position 46*a*. Sorting continues until movement from contact points 66*f*, 68*f*, 70*f* to home contact positions 66*g*, 68*g*, 70*g* occurs at the completion of the sixth or highest order digit cycle. Relay 180 is energized through a line from position 46*a* in order to allow the ground path along a line 181 to shunt relay 52 and to release relay 52, thereby stopping the device. At this point, the sorting operation is completed and all addresses 40 have been recorded in numerical order on transfer tape 12.

Figure 4:
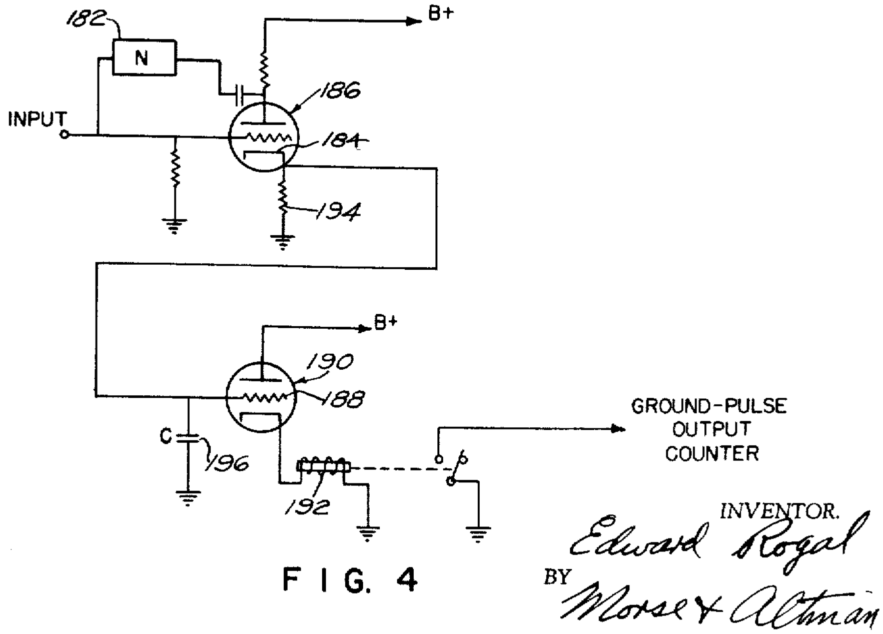
FIG. 4 is a schematic detail of a component of the system of FIG. 1.

FIG. 4 illustrates pulse shaper unit 94 which provides ground pulses to operate counter 16. A twin-T feedback network 182 has a band pass range of *f*0–*f*19. At any of these frequencies, the negative feedback is reduced to zero and the positive pulse from the cathode 184 of tube 186 raises the grid 188 of tube 190 above cutoff. In consequence, a relay 192 in the cathode circuit of tube 190 is energized in order to produce a ground pulse. The duration of the ground pulse may be adjusted by variable resistor 194 and capacitor 196.

Figure 5:
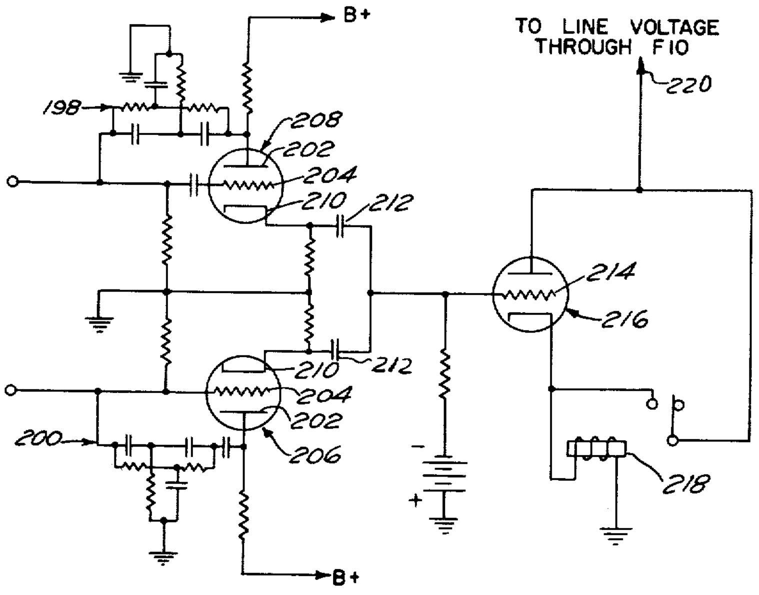
FIG. 5 is a schematic detail of another component of the system of FIG. 1.

FIGURE 5 illustrates one of tape selector relays 116 which has a filter network 198, 200. These filter networks normally provide negative feedback from the plate 202 to grids 204 and 204 of tubes 206 and 208, respectively. At the single frequency to which network 198, 200 is tuned, the feedback is reduced to zero and the pulse from cathodes 210, 210, passes through capacitor 212, 212 and raises the grid 214 of a thyratron tube 216 above cutoff. As tube 216 becomes conducting, a relay 218 in the cathode circuit closes and locks (by a suitable circuit not shown) to a clear bus 220 which is at line potential. When relay 127 is pulsed, relay 218 is released.

Figure 6:
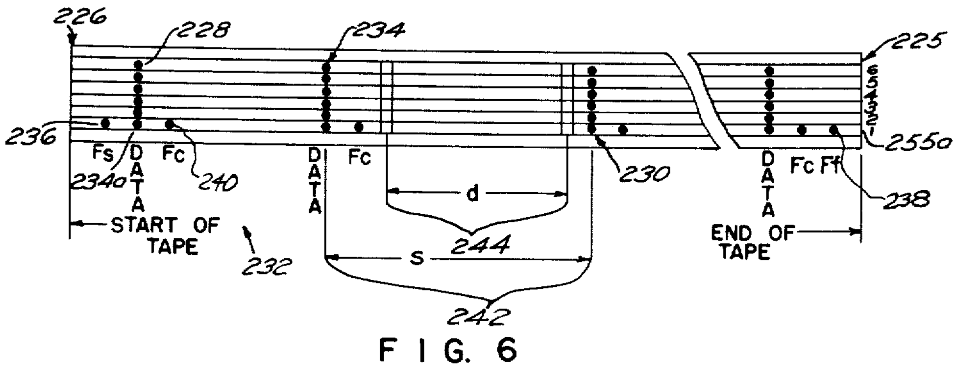
FIG. 6 represents the form of increments of information processed by an alternative system embodying the present invention.
Figure 7:
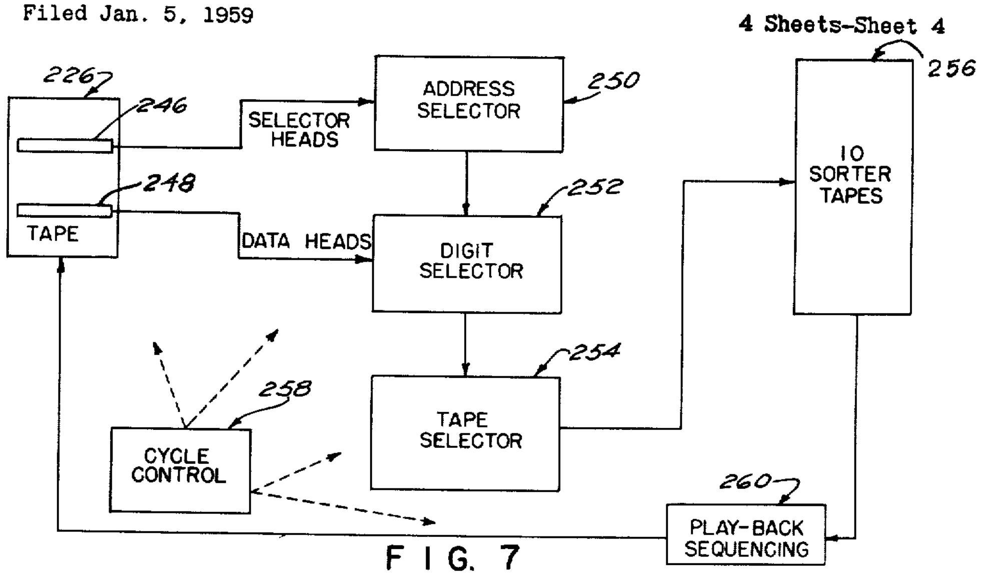
FIG. 7 is a block diagram of the alternative system of FIG. 6.
Figure 8:
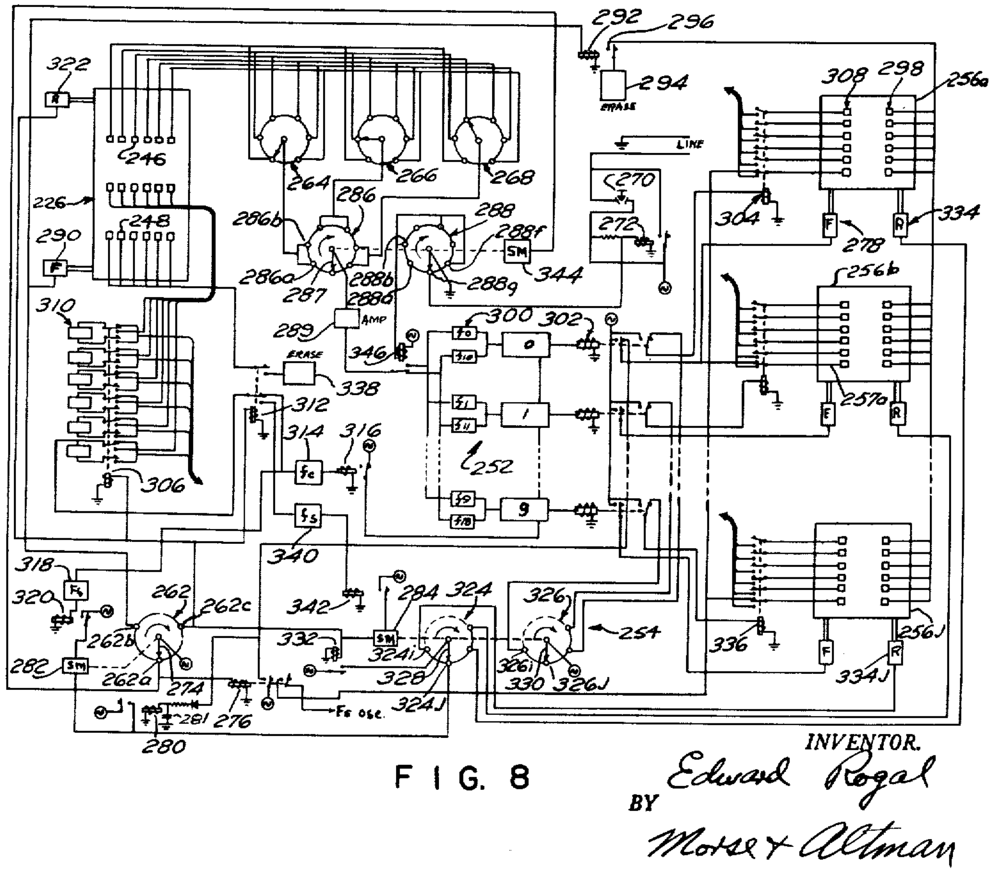
FIG. 8 is a schematic diagram of the electrical circuit of the system of FIG. 7.

*The System of FIGS. 6 Through 8*

With reference now to the system of FIGS. 6 through 8, the operation of this system generally will be understood in reference to FIGS. 6 and 7. For the purposes of this illustration, random data to be sorted has been recorded in parallel tracks 225 on a multitrack magnetic tape 226, either directly from data gathering units or indirectly from punched cards or perforated tape. Each pulse 228, of a group 230, is composed of two superposed, non-interfering frequencies, of which the first is selected from a group of ten frequencies, *f*0–*f*9, and the second is selected from a distinct group of ten frequencies, *f*10–*f*19. Thus each pulse 228 may be decoded into two decimal numbers, giving a total capacity of twelve digits in each block 232. This double frequency pulse is termed a blob 234.

A six digit address, by which sorting is to proceed, may be selected as desired by an operator. Any three blobs 234 of each block 232, selected in any order, may serve as this address. Tape 226 is processed under the control of three distinct index tones, including: a tape start tone (F*s*) 236; a tape complete tone (F*f*) 238; and a tape clear tone (F*c*) 240. A set of selector heads 246 and a set of data heads 248 are provided in response to the necessity for having a time delay between the tape selection function and the data read-out function. Accordingly, the spacing 242 is provided between blocks 232, which spacing is greater than the spacing 244 provided between selector heads 246 and data head 248.

As shown in FIG. 7, tape 226 serves as the input of random data to be sorted. As tape 226 is played, selector head 246 reads data 230 into an address selector 250. Selector 250 selects three channels 225 by which sorting is to proceed. A digit selector 252 selects one of the two digits of chosen blob 234 for transmission to a tape selector 254. Tape selector 254 decodes the digit and actuates an appropriate one of ten sorter tapes 256. Then the particular block 232 that effected selection passes under data head 248 and blobs 234 are re-recorded simultaneously on appropriate sorter tapes 256. When tape 226 has been played completely, a cycle control 258 actuates a playback sequencing control 260. With all ten sorter tapes 256 playing in reverse, their information is read back to tape 226 in sequence from the tenth tape to the first tape. Digit selector 252 then advances to the next lowest order digit and the process continues in this manner until sorting has been completed.

The illustrative circuit of FIG. 8 operates in the following manner. Three basic machine cycles are effected under the control of a distributor 262. The first cycle starts sorter tapes 256 and records tone 236 on each simultaneously. The second cycle performs the sorting operation from tape 226 to sorter tapes 256. The third cycle plays the sorter tapes back to tape 226.

The sorting program is determined by means of three tap switches 264, 266, 268. For purposes of illustration, a first channel 255*a* has been selected as the control channel and blobs 234 having digital vaues from three to one have been selected as the address. Switch 268 is set to the first two digits of the address; switch 266 is set to the second two digits; and switch 264 is set to the last two digits. The operator closes a start button 270 which actuates a relay 272. Relay 272 locks and distributes line voltage to required points in the electrical system. Line voltage of a wiper 274 of distributor 262 energizes a relay 276, which applies the line to all ten forward sorter tape drives 278 and records tone 236 on channel 255*a* of all ten sorter tapes 256. When relay 276 is energized, voltage across a capacitor 281 is large enough to close relay age across the capacitor 281 is large enough to close relay 280, a stepping magnet 282 of distributor 262 is pulsed. Wiper 274 thereby is moved to a second position contact point 262*b*. During this delay, voltage from a first position contact point 262*a* steps distributors 286, 288 to first position contact points 286*a*, 288*a*, respectively. At the conclusion of the time delay, distributor 262 steps to contact point 262*b*, a forward drive 290 of tape 226 is actuated, and a relay 292 closes. In consequence, an erase oscillator 294 is connected to a common bus 296, which feeds erase heads 298 of sorter tapes 256.

As first block 232 of data is transmitted by selector heads 246, the first blob 234 is transmitted through switch 264, 266, 268 and through distributor 286, all of which are at first position contact points. First blob 234 is received by a wiper 287 of distributor 286, amplified by an amplifier 289 and transmitted to the *f*10–*f*19 frequency bus of tape selector 254. The blob frequency component in the *f*10–*f*19 frequency range is selected by an appropriate filter 300 in order to close one of ten selector relays 302. The selected relay 302 locks (by means of a suitable circuit not shown) and actuates an associated sorter tape drive 278 and a head relay 304. At the contacts of relays 302, the ten heads of each channel of the ten sorter tapes 256 are wired in parallel and are connected to contacts on a relay 306 as shown by arrows. Thus, six recording heads 308 of an appropriate sorter tape 256 are connected to the outputs of six recording amplifiers 310. The particular data block 232 from which this selection was made now is transmitted through data heads 248 to tape 226. The six blobs 234 are read out, amplified by amplifiers 310, and re-recorded on an appropriately selected sorter tape 256.

Tone 240 on channel 255*a* of data blob 234*a* is detected as block 232 is transmitted, is transmitted through a relay 312 and is isolated by a clar tone filter 314, which pulses a relay 316. Relay 316 thereby removes voltage from a locking bus (not shown) common to selector relays 302. When the selected locked relay 302 is deactuated, the appropriate sorter tape 256 stops and its associated head relay 304 is deactuated. This process repeats when the next block 232 of data arrives at selector heads 246 of tape 226. When the last block 232 on tape 226 has been transmitted through data heads 248, tone 238 appears on channel 255*a*. Tone 238 is transmitted through relay 312 and is detected by a tape complete tone filter 318, which pulses a relay 320. Relay 320 actuates the stepping magnet 282 of distributor 262, thereby stepping wiper 274 to a third position contact point 262*c*. The current through wiper 274 actuates the reverse drive 322 of tape 226, closes relay 312 and actuates the stepping magnet 284 of distributors 324, 326. Wipers 328, 330 thereby are stepped to ninth position contact points 324*i*, 326*i* and a relay 332 is actuated. Stepping magnet 284 operates more rapidly than relay 332 in a manner that allows only one stepping of distributor 262. When wiper 328 arrives at a ninth position contact point 324*i*, a reverse drive 334*j* on the last sorter tape 256*j* is actuated.

By the action of distributor 326, a head relay 336 closes. The third position at contact point 262*c* of distributor 262 also energizes relay 306, which reverses input and output connections to recording amplifiers 310 so that now they may be used to read from ten sorter tapes 256 to tape 226. Sorter tape 256*j* now re-records onto tape 226, which is being erased as it plays in reverse through an erase oscillator 338 of relay 312. When sorter tape 256*j* has played completely, tone 236 appears and is detected by a tone start filter 340, which pulses a relay 342. In consequence, distributors 324, 326 are stepped to eighth position contact points. In this manner successive sorter tapes are played back successively until the first sorter tape 256*a* has been played back. Then, distributors 324, 326 step to home position contact points 324*j*, 326*j*, respectively. When wiper 328 steps to home position contact point 324*j*, voltage through relay 332 is transmitted to stepping magnet 282 of distributor 262 in order to step wiper 274 to contact point 262*a*. When distributor 262 steps to contact point 262*a*, the wipers of distributors 286, 288 are moved to second position contact points 286*b*, 288*b*. As distributor 288 steps to contact point 288*b*, a relay 346 closes in order to place the incoming blob 234 on the *f*0–*f*9 frequency bus, which feeds selector relays 302.

A second cycle is effected by the *f*0–*f*9 frequency component in first blob 234. Sorting continues until, at the end of the sixth cycle, distributor 288 is stepped from a sixth position contact point 288*f* to home position contact point 288*g*. Contact point 288*g* grounds relay 272 in order to release it and to remove line voltage from the circuit. Now all original random data on tape 226 has been sorted into numerical order in accordance with the six digit address program determined by the operator.

Since certain changes may be made in the apparatus without departing from the scope of the invention herein involved, it is intended that all matter contained in the above description or shown in the accompanying drawings shall be interpreted in an illustrative and not in a limiting sense.

What is claimed is:

1. An automatic data sorting device comprising a transfer medium for receiving a record representing random increments of digital information, a control system for receiving from said transfer medium signals representing said random increments of digital information and for sorting said random increments of digital information, and a plurality of sorter media for receiving from said control system signals representing said random increments of digital information, each of said increments of digital information being arranged in a sequence of orders, said control system including means for designating ones of said orders, means for selecting certain of said increments of digital information on the basis of the numerical values of said ones of said orders, means for transmitting to selected ones of said sorting media signals in a first sequence representing said certain of said increments of digital information, and means for causing said sorter media to transmit signals in a second sequence representing said certain of said increments of digital information back to said transfer medium, said sorter media constituting elongated magnetic tapes, whereby said increments of digital information are sequenced in predetermined numerical order, said transfer medium and said sorter media being surfaced with a magnetic medium.

2. An automatic data sorting device comprising a transfer tape for receiving a record representing random increments of digital information, a control system for receiving from said transfer tape signals representing said random increments of digital information and for sorting said random increments of digital information, and a plurality of sorter tapes for receiving from said control system signals representing said random increments of digital information, each of said increments of digital information being arranged in a sequence of orders, said control system including means for designating ones of said orders, means for selecting said increments of digital information on the basis of the numerical values of said ones of said orders, means for transmitting to selected ones of said sorter tapes signals representing said certain of said increments of digital information, and means for causing said sorter tapes in sequence to transmit signals representing said certain of said increments of digital information back to said transfer tape, each of said tapes having a magnetic surface having increments magnetizable in different states representing said numerical values, whereby said increments of digital information are sequenced in predetermined numerical order, said transfer tape and said sorter tapes being surfaced with a magnetic medium.

3. An automatic data sorting device comprising an input tape containing a record representing random digital increments, first transfer means for receiving signals from said input tape a transfer tape for receiving signals from said input transfer means, second transfer means for receiving signals from said transfer tape, delay storage means for receiving signals from said second transfer means, third transfer means for receiving signals from said transfer tape, counter means for receiving signals from said third transfer means, said counter means isolating certain of said digital increments, digital increment selector means for determining the value of digital increments so isolated and for producing a tape selector signal, tape selector means for establishing paths for reading information from said storage means, a plurality of sorter tapes for selectively receiving signals through said paths, and return means for transmitting signals representing said digital increments from said sorter tapes back to said transfer tape sequence, said tapes having magnetic surfaces increments of which are magnetizable in different states representing numerical values.

4. An automatic data sorting device comprising an input tape containing a record representing random digital increments, a plurality of selector transducer means associated with said input tape for generating signals in response movement with respect thereto, a plurality of data transducer means for generating signals in response thereto, said data transducer means being at a delaying position with respect to said selector transducer means, address selector means for receiving signals from said selector transducer means, digit selector means for selecting certain of said signals from said address selector means, tape selector means for detecting said certain of said signals, from said tape selector means, a plurality of sorter tapes for selectively receiving said certain of said signals from said tape selector means, cycle control means responsive to said transfer tape means in order to produce a control signal and playback sequencing control means responsive to said control signal for returning signals from said sorter tapes to said transfer tape means in ordered sequence, said tapes having magnetic surfaces increments of which are magnetizable in different states representing numerical values.

5. The automatic data sorting device of claim 1 wherein the orders of each increment are disposed in serial along said transfer tape.

6. The automatic data sorting device of claim 1 wherein the orders of each increment are disposed in parallel across said transfer tape.

7. The automatic data sorting device of claim 1 wherein said signals are in the form of frequency pulses.

8. The automatic data sorting device of claim 1 wherein said digits and orders are of decimal character.

9. The automatic data sorting device of claim 4 wherein said data transducer means are disposed in sequence transversely of said sorter tapes and said sorter tapes are movable forwardly and rearwardly in their direction of elongation.

10. The automatic data sorting device of claim 4 said data transducer means are disposed in sequence longitudinally of said sorter tapes and said sorter tapes are movable forwardly and rearwardly in their direction of elongation.

References Cited in the file of this patent

UNITED STATES PATENTS

| | | |
|---|---|---|
| 2,617,704 | Mallina | Nov. 11, 1952 |
| 2,784,049 | Mitchell | Mar. 5, 1957 |
| 2,901,732 | Canning | Aug. 25, 1959 |
| 2,907,003 | Hobbs | Sept. 29, 1959 |

OTHER REFERENCES

Publication I: Vol. III of Theory and Technique for Design of Electronic Digital Computers, Moore School of E.E., U. of Penn., June 30, 1948 (only page 22–13 necessary).